United States Patent
Baudisch et al.

(10) Patent No.: US 12,319,267 B2
(45) Date of Patent: Jun. 3, 2025

(54) METHOD AND CONTROL DEVICE FOR AUTOMATICALLY SETTING AN OPERATING MODE OF A HYBRID VEHICLE, AND HYBRID VEHICLE

(71) Applicant: Bayerische Motoren Werke Aktiengesellschaft, Munich (DE)

(72) Inventors: Sebastian Baudisch, Munich (DE); Johannes Dirnecker, Munich (DE); Marcel Ewers, Dachau (DE); Harald Hofmeier, Eching (DE); Christian Schmid, Munich (DE); Achim Sonntag, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 144 days.

(21) Appl. No.: 17/785,764

(22) PCT Filed: Jan. 15, 2021

(86) PCT No.: PCT/EP2021/050753
§ 371 (c)(1),
(2) Date: Jun. 15, 2022

(87) PCT Pub. No.: WO2021/156037
PCT Pub. Date: Aug. 12, 2021

(65) Prior Publication Data
US 2023/0053614 A1    Feb. 23, 2023

(30) Foreign Application Priority Data
Feb. 7, 2020    (DE) .................... 10 2020 103 117.3

(51) Int. Cl.
*B60W 20/12*    (2016.01)
*B60W 10/08*    (2006.01)
*B60W 20/16*    (2016.01)

(52) U.S. Cl.
CPC ............ *B60W 20/12* (2016.01); *B60W 10/08* (2013.01); *B60W 20/16* (2016.01); *B60W 2555/60* (2020.02)

(58) Field of Classification Search
CPC ...... B60W 20/12; B60W 10/08; B60W 20/16; B60W 2555/60; B60W 2556/50; B60W 50/0097; Y02T 10/62; Y02T 10/84
(Continued)

(56) References Cited

U.S. PATENT DOCUMENTS

| | | | |
|---|---|---|---|
| 2003/0078707 | A1 | 4/2003 | Shioda et al. |
| 2014/0046518 | A1 | 2/2014 | Roos et al. |

(Continued)

FOREIGN PATENT DOCUMENTS

| | | |
|---|---|---|
| CN | 103707878 A | 4/2014 |
| DE | 10 2008 047 923 A1 | 3/2010 |

(Continued)

OTHER PUBLICATIONS

International Search Report (PCT/ISA/210) issued in PCT Application No. PCT/EP2021/050753 dated Apr. 22, 2021 with English translation (five (5) pages).

(Continued)

*Primary Examiner* — Yi-Kai Wang
(74) *Attorney, Agent, or Firm* — Crowell & Moring LLP

(57) ABSTRACT

A method for automatically setting an operating mode of a hybrid vehicle includes determining whether a distance to the destination is greater than a purely electrically travelable range of the hybrid vehicle, wherein the hybrid vehicle is automatically put into a hybrid mode if the distance to the destination is greater than the purely electrically travelable range of the hybrid vehicle, and the hybrid vehicle is automatically put into a purely electrical drive mode if the distance to the destination is not greater than the purely (Continued)

electrically travelable range of the hybrid vehicle. A corresponding control device and hybrid vehicle are also disclosed.

12 Claims, 1 Drawing Sheet

(58) Field of Classification Search
USPC .......................................................... 701/22
See application file for complete search history.

(56) References Cited

U.S. PATENT DOCUMENTS

| | | | |
|---|---|---|---|
| 2017/0043761 A1* | 2/2017 | Morisaki | B60W 20/40 |
| 2018/0056973 A1 | 3/2018 | Belt et al. | |
| 2018/0334042 A1* | 11/2018 | Orozco | B60L 53/14 |
| 2019/0023258 A1* | 1/2019 | Karl | B60W 20/13 |
| 2019/0126907 A1* | 5/2019 | Park | B60W 20/16 |
| 2019/0176802 A1 | 6/2019 | Kim | |
| 2019/0344774 A1* | 11/2019 | Pursifull | B60W 20/13 |
| 2020/0284599 A1* | 9/2020 | Cyr | G01C 21/3469 |

FOREIGN PATENT DOCUMENTS

| | | |
|---|---|---|
| DE | 10 2013 215 012 A1 | 2/2014 |
| DE | 10 2017 004 690 A1 | 11/2018 |
| DE | 10 2018 114 769 A1 | 6/2019 |
| EP | 3 434 544 A1 | 1/2019 |

OTHER PUBLICATIONS

German-language Written Opinion (PCT/ISA/237) issued in PCT Application No. PCT/EP2021/050753 dated Apr. 22, 2021 (six (6) pages).

German-language Search Report issued in German Application No. 10 2020 103 117.3 dated Oct. 23, 2020 with partial English translation (12 pages).

Chinese-language Office Action issued in Chinese Application No. 202180006344.1 dated Jan. 10, 2025 with English translation (15 pages).

* cited by examiner

METHOD AND CONTROL DEVICE FOR AUTOMATICALLY SETTING AN OPERATING MODE OF A HYBRID VEHICLE, AND HYBRID VEHICLE

FIELD

The present invention relates to a method and to a control device for automatically setting an operating mode of a hybrid vehicle. In addition, the invention further relates to a hybrid vehicle comprising a control device of this kind.

BACKGROUND AND SUMMARY

It is known per se that different operating modes can be manually selected in hybrid vehicles, so that the hybrid vehicle in question can be driven in a purely electric manner, purely by means of an internal combustion engine or in a hybrid mode in accordance with a prespecification made by a driver for example. A driver can therefore change the mode with the push of a button or the like depending on the situation. One disadvantage here is that optimization for a specific route cannot be performed. Therefore, if a user were to for example manually prespecify that the hybrid vehicle should be started in the electric mode and should continue to be operated in the electric mode, the situation could occur that the traction battery is sometimes empty and the hybrid vehicle can no longer be electrically driven. In particular, it is in principle not possible in the purely electric operating mode to adapt a manner of operation or driving strategy of the hybrid vehicle to a route ahead.

DE 10 2013 215 012 A1 describes a method which allows a user to select different operating modes for a hybrid vehicle for different segments of a route. A route to the destination is determined on the basis of a destination being prespecified by the user. The route is automatically divided into different segments, after which the user is asked which operating modes they desire for the different segments. If, for example, the user regularly drives from their home to their place of work, provision may be made for a first segment of the route to pass through a portion of their neighborhood, a second segment to pass across country roads, and a third segment to pass along a motorway. Therefore, the user can for example prespecify that the hybrid vehicle should be driven in a purely electric manner in the first segment through their neighborhood, and the hybrid vehicle should be driven purely with internal combustion engine operation for example along the motorway, that is to say along the third segment. That is to say, the driver can prespecify a mode for each segment of the route. One disadvantage here is that manually specifying respective modes for each segment is laborious for the driver and manual optimization of efficiency is virtually impossible since this is usually performed on the basis of drive-internal characteristic variables.

The object of the present invention is to provide a solution by means of which firstly a purely electric driving mode on short routes and secondly optimum energy distribution on long routes can be ensured.

This object is achieved by a method and by a control device for automatically setting an operating mode of a hybrid vehicle having the features of the independent claims. Further possible refinements of the invention are specified in dependent claims in particular.

In the method according to the invention for automatically setting an operating mode of a hybrid vehicle, after a route to a destination has been determined, a check is made as to whether a distance to the destination is greater than a range of the hybrid vehicle that can be covered in a purely electric manner. The hybrid vehicle is automatically put into a hybrid mode when the distance to the destination is greater than the range of the hybrid vehicle that can be covered in a purely electric manner. The hybrid vehicle is automatically put into a purely electric driving mode when the distance to the destination is not greater than the range of the hybrid vehicle that can be covered in a purely electric manner.

Automatically setting the respective operating mode can be performed in particular upon starting the route guidance to the destination or else for example as early as upon starting-up the hybrid vehicle when the route guidance is already active. In the method according to the invention, provision is therefore made to gear the automatic setting or selection of the operating mode of the hybrid vehicle toward the existing electrical range and the distance to the destination that has been input. Therefore, in the method according to the invention, adapting the operating mode or driving mode of the hybrid vehicle is performed automatically and no longer only manually by respective prespecifications by the user of the hybrid vehicle. It is customary per se for the mode in which a hybrid vehicle can be started up to be able to be manually configured to hybrid or electric by a user. In the method according to the invention, it is possible for example to meet or to exceed such a customer prespecification, depending on the distance to a prespecified destination.

Particularly when the hybrid vehicle is a plug-in hybrid vehicle, the method according to the invention can be used particularly advantageously in the case of different driving behavior or use behavior of the hybrid vehicle. If the plug-in hybrid vehicle is frequently charged for example, the purely electric mode could be suitable as the start-up mode in particular. In the case of active destination guidance in conjunction with a long route however, the hybrid mode, where no manual change of mode is then necessary in the method according to the invention, would be the more efficient mode since the method according to the invention automatically sets the appropriate operating mode of the hybrid vehicle depending on whether the distance to the destination is greater than or less than the range of the hybrid vehicle that can be covered in a purely electric manner.

If for example the hybrid vehicle is moved along a commuter route between home and a place of work on weekdays, with the distance being less than the electric range, the hybrid vehicle can be automatically operated in the electric driving mode by means of the method according to the invention. If on the other hand the hybrid vehicle is used for a long journey to an excursion destination at a weekend for example, it is possible to automatically set the operating mode that is better for this case, that is to say the hybrid mode, for example directly upon starting the route guidance, by means of the method according to the invention.

Since the method according to the invention can perform an automatic change of mode on the basis of a respective distance to the destination, it is possible to perform adaptation of the operating mode of the hybrid vehicle depending on the situation, specifically without a user of the hybrid vehicle having to intervene. Therefore, the most efficient operating mode or driving mode is always activated by means of the method according to the invention.

One possible refinement of the invention makes provision for a manner of operation of the hybrid vehicle to be optimized for the route still ahead in accordance with at least one prespecified criterion provided that the hybrid mode is activated. For example, the hybrid vehicle can be operated such that as few emissions as possible are given off. It is also possible for example for a user of the hybrid vehicle to be able to choose between different criteria to which the hybrid vehicle should be optimized in respect of the route still ahead provided that the hybrid mode is activated. Therefore, it is possible for example for the hybrid vehicle to be able to be operated particularly efficiently while the hybrid mode is activated. Therefore, for example a maximum ability to experience electric driving can be rendered possible.

A further possible refinement of the invention makes provision for the hybrid vehicle to be put into the purely electric driving mode as soon as it has been determined that the distance to the destination is not greater than the range of the hybrid vehicle that can be covered in a purely electric manner. In other words, the hybrid vehicle is therefore put immediately into the purely electric driving mode as soon as it has been determined that the intended destination can be reached in a purely electric manner. In this case, the hybrid vehicle is therefore immediately solely driven in a purely electric manner, for example directly upon the route guidance beginning.

According to a further possible refinement of the invention, provision is made, if it was determined even before the hybrid vehicle was started that the distance to the destination is less than the range of the hybrid vehicle that can be covered in a purely electric manner, for the hybrid vehicle to be started in the electric driving mode. If, for example, a route that had already been determined beforehand is intended to be continued after an intermediate stop or a user has calculated a route with the hybrid vehicle not yet having been started for example, the hybrid vehicle is therefore automatically already started in the electric driving mode if the determined route is intended to be continued or started. In other words, the start-up mode of the hybrid vehicle is therefore automatically set to the electric driving mode when the route still to be covered to the destination is less than the range that can be covered in a purely electric manner. The vehicle is therefore likewise started in the appropriate electric driving mode. Therefore, emissions from the hybrid vehicle can already be minimized during the start-up process.

In a further possible embodiment of the invention, provision is made for the hybrid vehicle to be put into the hybrid mode only once the hybrid vehicle is no longer in a zero emission zone. This can likewise apply, for example, to an environmental zone. For example, a current position of the hybrid vehicle can be compared with map data or other data containing information about where zero emission zones in which internal combustion engine operation of vehicles is entirely banned are located. If, for example, it is established after determining the route to the destination that the distance to the destination is greater than the range of the hybrid vehicle that can be covered in a purely electric manner but the hybrid vehicle is in a zero emission zone, the hybrid vehicle is put into the hybrid mode only when the hybrid vehicle leaves this zero emission zone. Therefore, the restrictive provisions within the zero emission zone can be complied with, with the hybrid vehicle being put immediately into the hybrid mode after leaving the zero emission zone, so that the manner of operation of the hybrid vehicle can be optimized for the route still ahead.

A further possible refinement of the invention makes provision, if it was determined even before the hybrid vehicle was started that the distance to the destination is greater than the range of the hybrid vehicle that can be covered in a purely electric manner, for the hybrid vehicle to be started in the hybrid mode if the hybrid vehicle is not in a zero emission zone. If however it is established that the hybrid vehicle is in a zero emission zone, the hybrid vehicle is automatically started in the purely electric driving mode. If on the other hand the hybrid vehicle is not in a zero emission zone, the hybrid vehicle can be started directly in the hybrid mode when the hybrid vehicle is started up, for example directly upon starting the route guidance. Therefore, it is possible to optimize the manner of operation or driving strategy of the hybrid vehicle for the route still ahead from the very beginning of the route guidance.

The control device according to the invention for operating a hybrid vehicle is designed to carry out the method according to the invention or possible refinements of the method according to the invention. Possible refinements of the method according to the invention can be considered to be possible refinements of the control device and vice versa, with the control device in particular having means for carrying out the method steps.

The hybrid vehicle according to the invention comprises the control device according to the invention or a possible refinement of the control device according to the invention. The hybrid vehicle may be, in particular, a plug-in hybrid. Owing to the purely electric range which is usually relatively high in plug-in hybrid vehicles, it is possible to optimize the manner of operation of the hybrid vehicle for the route still ahead particularly well, provided that the hybrid mode is activated in the hybrid vehicle.

Further features of the invention can be found in the following description of figures and on the basis of the drawing. The features and feature combinations mentioned above in the description, and the features and feature combinations mentioned below in the description of the figures and/or shown only in the figures, may be used not only in the respectively indicated combination but also in other combinations or individually without departing from the scope of the invention.

DETAILED DESCRIPTION

Figure 1:
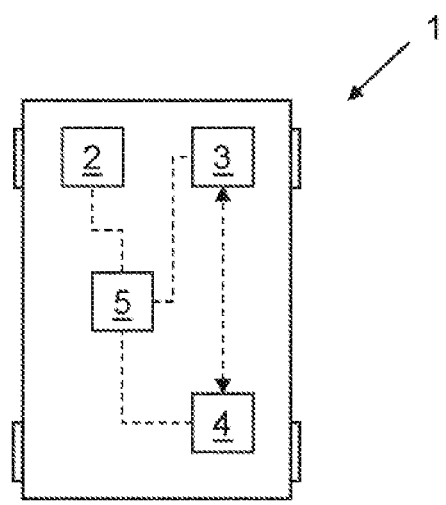
FIG. 1 shows a highly schematic illustration of a plug-in hybrid vehicle.

FIG. 1 shows a highly schematic illustration of a hybrid vehicle 1 in the form of a plug-in hybrid. The hybrid vehicle 1 comprises an internal combustion engine 2 and an electric drive machine 3 for driving the hybrid vehicle 1. In addition, the hybrid vehicle 1 further comprises a traction battery 4 which is designed, amongst other things, to supply power to the electric drive machine 3. In addition, the hybrid vehicle 1 has a control device 5 which is designed to automatically set different operating modes of the hybrid vehicle 1.

Figure 2:
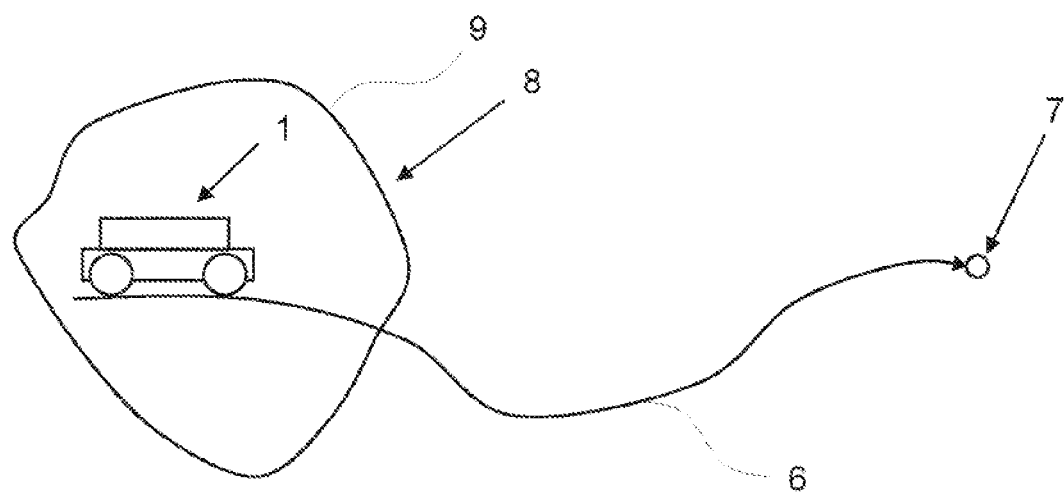
FIG. 2 shows a schematic illustration of a route to a destination that is still to be taken by the hybrid vehicle.

FIG. 2 schematically illustrates a route 6 which leads to a destination 7 that, for example, a user of the hybrid vehicle 1 has entered into a navigation system of the hybrid vehicle 1. After the route 6 to the destination 7 has been determined, for example by means of the navigation system of the hybrid vehicle 1, the control device 5 checks whether a distance to the destination 7 is greater than a range of the hybrid vehicle 1 that can be covered in a purely electric manner. If this is the case, the control device 5 can automatically put the hybrid vehicle 1 into a hybrid mode in which therefore both the internal combustion engine 2 and the electric drive machine 3 can be used to drive the hybrid vehicle 1. In the hybrid mode, it is also possible for example for the hybrid vehicle 1 to operate in what is known as a charge sustaining mode in order to keep a state of charge of the traction battery 4 more or less constant when in this mode. If required, the electric drive machine 3 can also be used for example for what is known as boosting if a user of the hybrid vehicle 1 wishes to call up a particularly large amount of power or torque, for example in the case of an overtaking operation.

Provided that the hybrid vehicle 1 is operated in the hybrid mode, the control device 5 can optimize the manner of operation of the hybrid vehicle 1 for the route 6 still ahead in accordance with at least one prespecified criterion. Therefore, it is possible for example to operate the hybrid vehicle 1 in a particularly energy-efficient manner and, for example on the basis of the route 6 ahead, to use the internal combustion engine 2 and the electric drive machine 3 in a manner coordinated with one another such that the hybrid vehicle 1 consumes a particularly small amount of energy overall. Other manners of operation are of course also possible.

In the present case, a zone with relatively stringent emission regulations in the form of a zero emission zone 8 is schematically indicated, the hybrid vehicle 1 still being in the zero emission zone before the beginning of the route guidance or before the beginning of the journey to the destination 7. Therefore, for example, the navigation system of the hybrid vehicle 1 or else an external navigation device can be used to determine where the hybrid vehicle 1 is and whether it is currently in such a zero emission zone 8. In such a case, the control device 5 puts the hybrid vehicle 1 into the hybrid mode once the hybrid vehicle 1 is no longer in the zero emission zone 8, that is to say crosses a boundary 9 of the zero emission zone 8. If it was determined even before the hybrid vehicle 1 was started that the distance to the destination 7 is greater than the range of the hybrid vehicle 1 that can be covered in a purely electric manner, the hybrid vehicle 1 is started directly in the hybrid mode only if the hybrid vehicle 1 is not in such a zero emission zone 8. In the case shown by way of example in the present case, the hybrid vehicle 1 would therefore also be initially started up in a purely electric manner when the route guidance is started and operated in the purely electric manner until the boundary 9 has been crossed.

If however the distance to the destination 7 is not greater than the range of the hybrid vehicle 1 that can be covered in a purely electric manner, the control device 5 puts the hybrid vehicle 1 immediately into a purely electric driving mode. If for example a user still performs route determination with the hybrid vehicle 1 stationary or not started, the control device 5 can ensure that the hybrid vehicle 1 is started directly in the purely electric driving mode. This can be done irrespective of whether the hybrid vehicle 1—as schematically indicated here—is in such a zero emission zone 8 or not. Therefore, if the control device 5 identifies that the route 6 to the destination 7 is shorter than the range of the hybrid vehicle 1 that can be covered in a purely electric manner, the hybrid vehicle 1 is started directly in the electric driving mode and covers the entire route 6 in the purely electric driving mode.

Owing to the automatic adaptation of the operating mode of the hybrid vehicle 1 depending on the situation without user interaction, the respectively appropriate operating mode or driving mode is therefore always set depending on the distance to the destination 7 and taking into account the purely electric range still available.

LIST OF REFERENCE SIGNS

1 Hybrid vehicle
2 Internal combustion engine
3 Electric drive machine
4 Traction battery
5 Control device
6 Route
7 Destination
8 Zero emission zone
9 Boundary of the zone

What is claimed is:

1. A method for automatically setting an operating mode of a hybrid vehicle, the method comprising:
   determining, before the hybrid vehicle is started-up, whether a distance from a present location to a destination is greater than or not greater than a range of the hybrid vehicle that can be covered in a purely electric manner, wherein the destination is set by a user as a destination of a trip prior to starting-up the hybrid vehicle;
   automatically putting the hybrid vehicle into a hybrid mode for a duration of the trip to the destination in response to determining that the distance to the destination set by the user is greater than the range of the hybrid vehicle that can be covered in a purely electric manner; and
   automatically starting-up the hybrid vehicle in a purely electric driving mode and putting the hybrid vehicle into the purely electric driving mode starting at the present location in response to determining, before the hybrid vehicle is started-up, that the distance to the destination set by the user is not greater than the range of the hybrid vehicle that can be covered in a purely electric manner.

2. The method according to claim 1, further comprising:
   optimizing a manner of operation of the hybrid vehicle for the route still ahead in accordance with at least one prespecified criterion that the hybrid mode is activated.

3. The method according to claim 1, further comprising:
   putting the hybrid vehicle into the purely electric driving mode as soon as it has been determined that the distance to the destination is not greater than the range of the hybrid vehicle that can be covered in a purely electric manner.

4. The method according to claim 1, further comprising:
   determining that the hybrid vehicle is not in a zero emission zone; and
   putting the hybrid vehicle into the hybrid mode in response to determining that the hybrid vehicle is not in the zero emission zone.

5. The method according to claim 1, further comprising:
   determining, before the hybrid vehicle is started-up, that the distance to the destination is greater than the range of the hybrid vehicle that can be covered in a purely electric manner; and
   responsively starting-up the hybrid vehicle in the hybrid mode.

6. A control device for operating a hybrid vehicle, the control device configured to:
   determine, before the hybrid vehicle is started-up, whether a distance from a present location to a destination is greater than or not greater than a range of the hybrid vehicle that can be covered in a purely electric manner, wherein the destination is set by a user as a destination of a trip prior to starting-up the hybrid vehicle;

automatically put the hybrid vehicle into a hybrid mode for a duration of the trip to the destination in response to determining that the distance to the destination set by the user is greater than the range of the hybrid vehicle that can be covered in a purely electric manner; and automatically start-up the hybrid vehicle in a purely electric driving mode and put the hybrid vehicle into the purely electric driving mode starting at the present location in response to determining, before the hybrid vehicle is started-up, that the distance to the destination set by the user is not greater than the range of the hybrid vehicle that can be covered in a purely electric manner.

7. The control device according to claim 6, further configured to:

optimize a manner of operation of the hybrid vehicle for the route still ahead in accordance with at least one prespecified criterion that the hybrid mode is activated.

8. The control device according to claim 6, further configured to:

put the hybrid vehicle into the purely electric driving mode as soon as it has been determined that the distance to the destination is not greater than the range of the hybrid vehicle that can be covered in a purely electric manner.

9. The control device according to claim 6, further configured to:

determine that the hybrid vehicle is not in a zero emission zone; and put the hybrid vehicle into the hybrid mode in response to determining that the hybrid vehicle is not in the zero emission zone.

10. The control device according to claim 6, further configured to:

determine, before the hybrid vehicle is started-up, that the distance to the destination is greater than the range of the hybrid vehicle that can be covered in a purely electric manner; and responsively start-up the hybrid vehicle in the hybrid mode.

11. A hybrid vehicle comprising the control device according to claim 6.

12. The hybrid vehicle according to claim 11, wherein the hybrid vehicle is a plug-in hybrid.

* * * * *